Figures 1, 2:
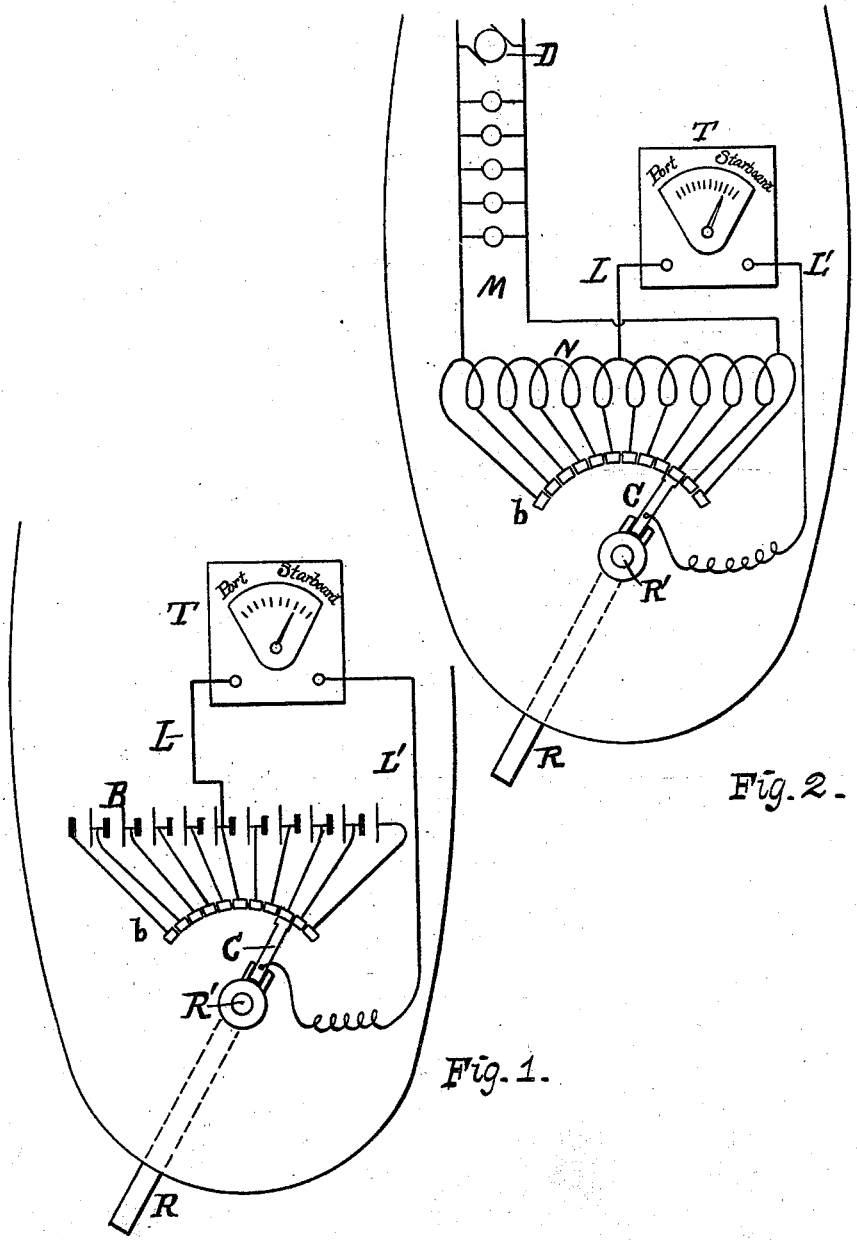

(No Model.)

M. PFATISCHER.
TELLTALE FOR STEERING GEAR OF SHIPS.

No. 561,431. Patented June 2, 1896.

Witnesses

Inventor
Matthias Pfatischer
by Harold Binney
Attorney

UNITED STATES PATENT OFFICE.

MATHIAS PFATISCHER, OF PHILADELPHIA, PENNSYLVANIA, ASSIGNOR TO THE ELECTRO-DYNAMIC COMPANY, OF PENNSYLVANIA.

TELLTALE FOR STEERING-GEAR OF SHIPS.

SPECIFICATION forming part of Letters Patent No. 561,431, dated June 2, 1896.

Application filed August 12, 1895. Serial No. 559,084. (No model.)

*To all whom it may concern:*

Be it known that I, MATHIAS PFATISCHER, of Philadelphia, Pennsylvania, have discovered and invented a new and useful Improvement in Telltales for the Steering-Gear of Ships, of which the following is a description, referring to the accompanying drawings, which form a part of this specification.

The object of the invention is to produce a simple and reliable telltale that may be located in the pilot-house or other convenient position on a ship and which will accurately indicate the position of the ship's rudder.

To these ends and objects the invention is embodied in the electrical apparatus constructed, arranged, combined, and used in substantially the manner herein described, illustrated, and claimed.

The nature of the invention is such that it will be very readily understood from the drawings, wherein—

Figure 1 is a diagrammatic illustration of a simple form of the invention employing storage or other batteries as the source of electric power, and Fig. 2 is a similar diagram in which the electric power is derived from the lighting or other electric circuits of the ship.

Throughout the drawings like letters of reference indicate like parts.

The rudder is indicated at R, the rudder-post by R', and the telltale by T. The telltale itself is substantially similar to a voltmeter or any other device capable of indicating voltage, current, or electrostatic difference of potential.

In Fig. 1 batteries B are used as the source of electric power. There are ten of these batteries connected in series, and from the terminals of each battery or pair of batteries a connection is made to one of a series of eleven contact-plates. A movable contact C, moved by the ship's rudder, travels over these contacts. A conductor L connects one terminal of the telltale with the center of the set of batteries—that is to say, there are five batteries on each side of this central connection. The other terminal of the telltale is connected to the movable contact C by the conductor L'. The contacts b are so arranged that when the rudder is in its central position the movable contact or switch C is upon the central contact b, and therefore no electromotive force is introduced in the circuit of the telltale. When, however, the rudder is turned in one direction or the other, the contact C, moving over the series of contacts b, introduces more or less of the batteries B into the telltale-circuit, and so introduces more or less electromotive force in one or the other direction, causing the telltale-index to be moved in a corresponding direction. The index-dial or telltale-plate is calibrated to correspond with the degrees and direction through which the helm or rudder of the ship is moved, and in this manner the telltale always accurately indicates the exact angular position of the rudder or helm.

It will be seen that the batteries B may be located conveniently near the rudder-post, and the switch or movable contact C may be turned directly by the rudder, as indicated. The two wires L L' only are led to the telltale, and in place of either one of these the ship or the ocean may be substituted by "grounding."

In Fig. 2 my preferable arrangement is shown, in which the dynamo D and lighting-circuit M of the ship are employed for the necessary electromotive force, and the resistance-coils N are connected to the two mains and subdivided, as shown, to give the several connections for the contacts b. As before, the conductor L is run to the center of the resistance-coils N, and the conductor L' connects the other terminal of the telltale with the movable contact C. It is obvious that the motion of the contact C in one or the other direction will be indicated upon the telltale T, just as in Fig. 1. Moreover, so long as the voltage of the lighting-circuit is kept constant the calibration and correct indication of the telltale is assured, since the resistance-coils N accurately subdivide the voltage between the mains M at all times. Indeed, any increase or decrease of the voltage of the lighting-circuit would merely cause an increase or decrease in the angle indicated by the telltale; but this change would be strictly proportionate, and would therefore be of small importance.

While I have shown two means of producing the necessary electric energy for operating my device and have shown a telltale constructed substantially on the lines of a Weston or other volt-meter, I claim, and desire to secure by these Letters Patent of the United States, together with all such modifications as may be made by mere skill in the art and with only the limitations as expressed or by law implied in view of the related art, as follows:

1. In combination with a ship's steering-gear and a source or sources of electric energy, a series of contacts $b$ respectively connected with different portions or divisions of the said source or sources, an electric telltale or indicator, a circuit or conductors L, L' therefor, one end of the said circuit being connected to one point or division of the said source or sources, adjustable switch connections for said contacts $b$ connected to the other end of said circuit or conductors to include more or less of the said portions or divisions in the said circuit or conductors L, L', and mechanical connections from the said steering-gear for adjusting the said switch connections, for the purposes substantially as described.

2. In combination with a ship's steering-gear and lighting or other electric mains, a resistance N introduced between the said mains, a series of contacts $b$, respectively connected with different portions or subdivisions of the said resistance N, a single wire-circuit and electric telltale connected between one portion of the said resistance and a movable contact C, and mechanical connections between the said steering-gearing and said movable contact, for actuating said contact, the said movable contact being arranged to make contact with the said series of contacts, substantially as set forth.

In testimony whereof I have hereunto set my hand, at the city of Philadelphia, Pennsylvania, this 7th day of August, A. D. 1895.

MATHIAS PFATISCHER.

In presence of—
JOHN RODGERS,
L. BANCROFT MELLOR.